United States Patent [19]
Kronberg et al.

[11] Patent Number: 5,499,529
[45] Date of Patent: Mar. 19, 1996

[54] DETECTING SMALL HOLES IN PACKAGES

[75] Inventors: James W. Kronberg; James R. Cadieux, both of Aiken, S.C.

[73] Assignee: The United States of America as represented by the United States Department of Energy, Washington, D.C.

[21] Appl. No.: 70,196

[22] Filed: Jun. 2, 1993

[51] Int. Cl.⁶ ............................................. G01M 3/20
[52] U.S. Cl. ............................................. 73/40.7
[58] Field of Search ....................... 73/40.7; 53/403, 53/79, 170, 53, 507, 508

[56] References Cited

U.S. PATENT DOCUMENTS

| | | | |
|---|---|---|---|
| 3,027,753 | 4/1962 | Harder, Jr. | 73/40.7 |
| 3,091,114 | 5/1963 | Webster | 73/40.7 X |
| 3,585,845 | 6/1971 | Cornell et al. | 73/40.7 |
| 3,591,944 | 7/1971 | Wilcox | 53/53 X |
| 3,592,049 | 7/1971 | Johanski, Jr. | 53/53 X |
| 3,708,949 | 1/1973 | Wilcox | 53/508 X |
| 3,744,210 | 7/1973 | O'Lenick et al. | 73/40.7 X |
| 4,226,113 | 10/1980 | Pelletier et al. | 73/40.7 |
| 4,328,700 | 5/1982 | Fries | 73/40.7 |
| 4,722,219 | 2/1988 | Batcher et al. | 73/16 X |
| 5,029,463 | 7/1991 | Schvester et al. | 73/40.7 |
| 5,163,315 | 11/1992 | Asai et al. | 73/40.7 |
| 5,369,983 | 12/1994 | Grenfell | 73/40.7 |
| 5,373,729 | 12/1994 | Seigeot | 73/40.7 X |
| 5,388,446 | 2/1995 | Kronberg | 73/40.7 |

FOREIGN PATENT DOCUMENTS

| | | | |
|---|---|---|---|
| 2344008 | 10/1977 | France | 73/40.7 |
| 1218753 | 6/1966 | Germany | 73/40.7 |
| 2441123 | 3/1976 | Germany | 73/40.7 |
| 139899 | 1/1980 | Germany | 73/40.7 |
| 79635 | 3/1989 | Japan | 73/40.7 |
| 868389 | 9/1981 | U.S.S.R. | 73/40.7 |

OTHER PUBLICATIONS

Concentration and Ultrasensitive Chromatographic Determination of Sulfur Hexafluoride for Application to Metcorological Tracing, by C. A. Clemsons, A. I. Coleman, and B. E. Saltzman, published in Environmental Science and Technology, vol. 2, No. 7, Jul. 1966.

Pimenov, V. V. An Electron Capture Leak Tester. in Sov. J. Non–Dest. Test (USA) vol. 14, No. 6, pp. 532–536 Jun. 1978.

Primary Examiner—Hezron E. Williams
Assistant Examiner—Michael J. Brock
Attorney, Agent, or Firm—Brian Tumm; Harold M. Dixon; William R. Moser

[57] ABSTRACT

A package containing a tracer gas, and a method for determining the presence of a hole in the package by sensing the presence of the gas outside the package. The preferred tracer gas, especially for food packaging, is sulfur hexafluoride. A quantity of the gas is added to the package and the package is closed. The concentration of the gas in the atmosphere outside the package is measured and compared to a predetermined value of the concentration of the gas in the absence of the package. A measured concentration greater than the predetermined value indicates the presence of a hole in the package. Measuring may be done in a chamber having a lower pressure than that in the package.

21 Claims, 1 Drawing Sheet

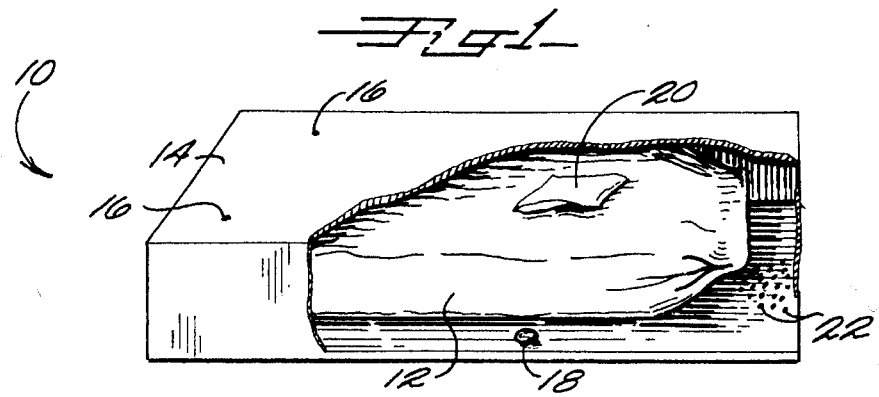
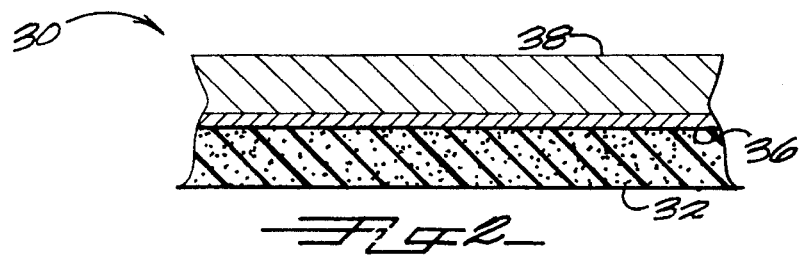
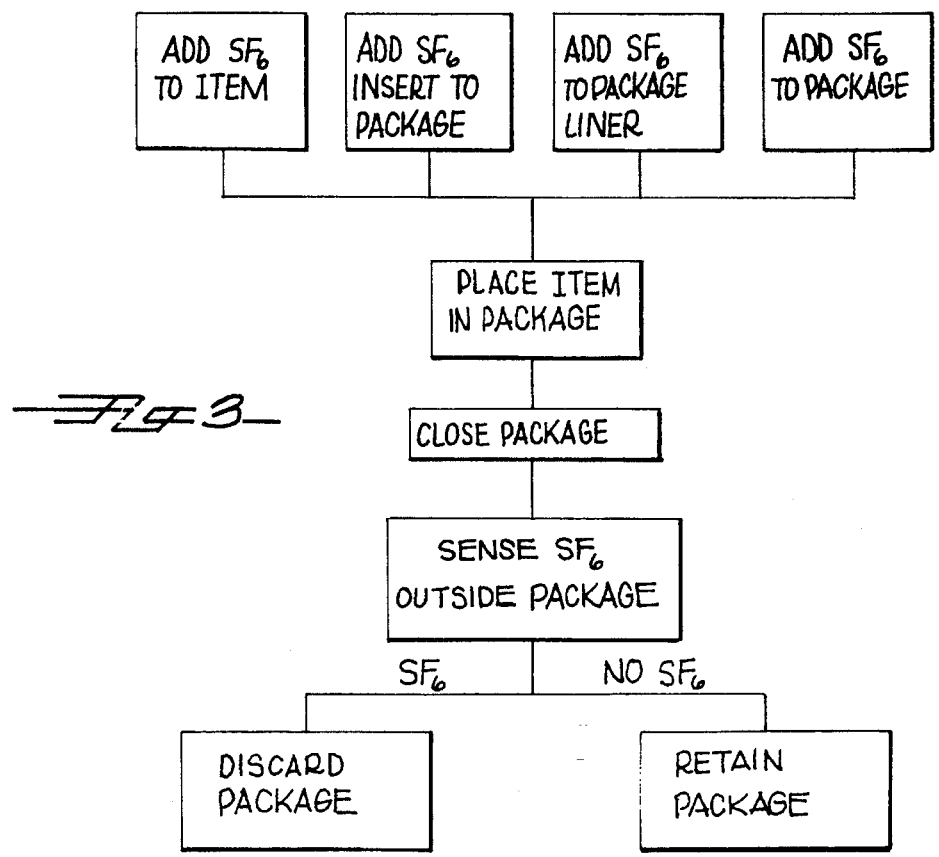

DETECTING SMALL HOLES IN PACKAGES

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to detecting small holes in packages. In particular, the present invention relates to use of tracer gases to detect leaks in packages, especially packages containing consumable products.

2. Discussion of Background

A vast array of products are marketed in closed packages. These products include consumable products, such as processed and unprocessed foods, herbs, spices, condiments, food supplements, medicines and beverages, and other consumer products such as batteries, film, and toiletries. In addition to their primary functions of containing and protecting the products from impact, packages provide barriers to bacteria, moisture and oxygen that might degrade or corrode the product. They carry advertising and instructions for use; they facilitate handling and stacking.

It is especially important to ensure the safety of food products. Many packaged non-food items also deteriorate as a result of leakage or contact with air. Assuring food product safety is very costly. Costs are incurred in processing the food prior to packaging, in adding preservatives and in expiration dating and in recovering and disposing of spoiled foods.

A complicating factor in assuring product safety is the sheer number of packages involved. Consumables are usually sold in relatively small quantities, except for commercial use. Another complicating factor is the number of different types, sizes, and styles of containers. Consumables can be packaged in aluminum or galvanized steel, glass bottles and plastic bottles with metal or plastic lids, rigid plastics or flexible plastics, metallicized plastics, and pasteboard.

Because of the scope of the problem of package inspection, typically only a limited number of packages are inspected in order to draw a statistical conclusion about the integrity of the package.

Some methods are available for testing packages. Air leak testing involves pressurizing the package by injecting air and measuring the decay in pressure caused by leaks. In compression testing, a filled, sealed package is placed on a flat surface and pressure is applied while an observer looks for leaks. Compression testing causes weak packages to fail but does not damage normal packages. Distribution testing simulates the events likely to occur during the package distribution process, including vibration, drop testing, and compression. Other methods include incubating at increased temperatures to stimulate microbial growth, viewing under polarized light to inspect plastic seals for defects or entrapped food, backlighting of empty packages to reveal holes, using X-rays to locate glass shards within glass jars, and measuring eddy currents to sense the position of metal components of packages. Most testing is destructive, must be done by skilled personnel and requires removing sample packages from the production line. These methods are inefficient, expensive and wasteful.

Holes down to approximately 100 μm in size can be seen by the naked eye. Therefore, visual inspection is the most commonly-used testing method. The presence of visible holes, cuts, tears, dents, etc. indicates that the integrity of the package has been compromised. However, visual inspection is prohibitively expensive when 100% testing is required. Furthermore, small holes or crevices known as microleaks—holes less than approximately 100 μm in size—cannot be found by visual inspection. Even such small holes provide pathways for bacterial contamination, leakage of air into the package, and, for some packaged items, slow leakage of the contents of the package. At present, microleaks can be identified only by destructive techniques. Nondestructive testing would offer the ability to evaluate every package produced rather than just a small sampling.

Helium and other gases, including sulfur hexafluoride ($SF_6$), are used in industry as tracer gases to detect leaks in pressure vessels (Asai, et al., U.S. Pat. No. 5,163,315; Cornell, et al., U.S. Pat. No. 3,585,845), fluid processing systems (Fries, U.S. Pat. No. 4,328,700) and steam condensers (Pelletier, et al., U.S. Pat. No. 4,226,113). The gas will pass through cracks or holes in pipe walls and is then subject to detection on the opposing side of the wall. Typically, in these industrial applications, the device to be tested is taken off-line, its orifices sealed and a small quantity of the tracer gas injected. If no trace of the gas appears on the outside of the wall, the device is presumed to be without holes or cracks. Then the device is placed back on line. Leak testing is generally done periodically, every year for example.

Helium is preferred in industry because its atoms are very small and low in mass, it has a high thermal velocity, and therefore can penetrate and move quickly through tiny openings or cracks in thick metal piping. Helium leak testing has also been used with food packages on a limited basis.

The inert gases, including helium, are not suitable for use in routine package testing. For example, because helium is chemically inert, it is difficult to detect, especially at low concentrations in air. Helium can be detected using a mass spectrometer, but mass spectrometers are relatively complex, delicate, and expensive instruments, limited in sensitivity to about 1 part per million (ppm). Routine package testing using helium as a tracer would therefore require large amounts of helium inside each package. Because of its low solubility in water and most other solvents, including edible oils, helium for leak-testing would necessarily be provided by replacing the air inside the package with helium. Helium has a low molecular weight and a low boiling point, thus, there is no known practical way of recapturing such packaged helium for re-use. Finally, because of its low molecular weight, helium readily diffuses through many intact solid materials, including common organic materials such as rubber, paper, plastic film, and so forth, some of which are favored for packaging consumables.

Them remains a need for a method for detecting small holes in packages that does not have the drawbacks of injecting helium into the container and yet provides increased assurance of the integrity of the package and is suitable for use in 100% product testing.

SUMMARY OF THE INVENTION

According to its major aspects and broadly stated, the present invention is a package with a product and tracer gas inside that lends itself to leak testing and a method for detecting the presence of a hole in a package. The tracer gas is preferably sulfur hexafluoride ($SF_6$), although other, non-toxic perfluorinated gases such as carbon tetrafluoride ($CF_4$)

may also be used. A quantity of the tracer gas is put into the package along with the product and the package is closed. The concentration of the tracer gas in the atmosphere outside the package is then measured and compared to a predetermined value. A measured concentration greater than the predetermined value indicates that the packaging material may have a small hole in it.

To ensure the safety of their products, food processors are required by law to assess the integrity of the packages they distribute. Ideally, all packages are inspected at least visually. However, routine inspection of all packages is time-consuming and expensive, so testing is usually carried out on sample packages removed from the production line. Sampling offers a method for assessing the overall quality of the packages, but cannot indicate which of the packages actually distributed by the manufacturer are defective.

Defective packages are rare—some experts estimate fewer than 1 package in 10,000 is defective. However, even such a low rate translates to a large number of defective packages when one considers the total number of items that are packaged every year. Assuming average food consumption to be approximately two pounds (about 0.9 kg) per person per day, this amounts to almost two billion tons (about $2 \times 10^{12}$ kg) per year. If just 10% of yearly food consumption is in the industrialized nations, and 10% of that is in the form of packaged products, as much as 20 million tons (about $2 \times 10^{10}$ kg) of packaged foods are consumed each year. Assuming further that a typical food package weighs 1 pound (about 0.5 kg), this amounts to $4 \times 10^{10}$ packages per year. Even one defective package in 10,000 means that four million defective packages could enter the marketplace each year. Because testing every package is a seemingly unthinkable option, doing so has not been seriously considered.

For example, most consumers discard or do not select a package that appears abnormal. Many packages are transparent so that spoilage of the contents would be apparent to the wary shopper. Therefore, a good many packages that are defective are "sorted out" at the marketplace. Some packages have special tops to warn the consumer that the package is not sealed properly. Expiration dating and addition of preservatives prevent consumption of many products that might otherwise have become tainted by bacteria passing through holes in packaging. Finally, many products are not packaged at all, leaving the consumer to recognize signs of decay.

Nevertheless, the economic and social costs of package failure can be enormous. In addition to the manufacturer's potential tort liability, injury due to a defect in a single package can result in increased insurance costs, loss of consumer confidence in the product and loss of market share by the manufacturer. Routine, nondestructive testing of packages would help to ensure that products leave the manufacturer in a safe condition. The present invention offers a method for such testing. Furthermore, the present method lends itself to an automated system, which is essential for cost effectiveness in testing a large number of packages containing consumable products.

An important feature of the present invention is the choice of tracer gas. The tracer gas is preferably $SF_6$. This gas is normally present in the atmosphere in extremely small quantities, so that the existence of a hole in the package can be reliably drawn from the presence of the gas in the air outside the package. $SF_6$ has a high molecular weight, so it passes through small cracks and holes but does not diffuse readily through intact packaging materials, particularly organic materials such as paper and plastic film. It is colorless, odorless, tasteless, chemically and physiologically inert, yet detectable at very low concentrations. Because it can be easily synthesized from plentiful starting materials, it is potentially quite inexpensive in large quantities, requiring only a scale-up of current manufacturing methods. Furthermore, the use of $SF_6$ can enable the automation of the leak detection process. These qualities render it especially suitable for use with the present invention where it remains with the package—unless that package has a hole in it—until the package is opened by the consumer. The molecular weight of sulfur hexafluoride is 146.07. Alternatively, fluorocarbons such as carbon tetrafluoride, $CF_4$, (molecular weight 88.01) can be used.

$SF_6$ is presently used in the high-voltage transformer and circuit-breaker industry, and for leak-testing of industrial process equipment. Since leak-testing requires shutting down production, testing may be undertaken only to detect and isolate a suspected leak. Leak-testing is conducted on a regular schedule in some industries. For example, process piping in nuclear reactors is tested perhaps annually for leaks. Leak-testing of relatively small, enclosed systems such as packaged products is not undertaken routinely. Furthermore, presently-available methods destroy the package, so only a small sample of packages can be tested at all.

An important feature of the present invention is the combination of $SF_6$ and the package. Putting $SF_6$ in the package so that, if there are holes, it can escape, can be done in several convenient ways. As examples, a quantity of the gas can be injected into the package just before closure; the package can be provided with a gas-containing liner; a gas-containing insert can be deposited into the package; the product to be packaged can be exposed to the gas so that a quantity of the gas is absorbed; and finally the tracer gas may be dissolved in a liquid such as water, an edible oil, mineral oil or alcohol, and mixed with the product or deposited in the package.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective, partially cut-away view of a packaged item according to a preferred embodiment of the present invention;

FIG. 2 is a cross-sectional view of a packaging material according to the present invention; and FIG. 3 is a flow chart of a method for testing packages according to the present invention.

DETAILED DESCRIPTION OF A PREFERRED EMBODIMENT

According to a preferred embodiment of the present invention, a small hole in a package is detected by putting a quantity of a tracer gas into the package along with the product, closing the package, and then sensing the presence of the gas outside the package. The gas is preferably one that passes through small holes, but does not diffuse readily through intact packaging materials, particularly organic materials such as paper and plastic. The existence of a hole in the package is determined from the presence of the gas outside the package.

A suitable tracer gas for use with the present invention has a high molecular weight to retard diffusion through intact packaging materials, preferably a molecular weight of at least approximately 50 and more preferably a molecular weight of at least approximately 100. The gas must be physiologically inert, detectable at very low concentrations in air, and should not affect the taste, texture and appearance of the product. It should not be present in the atmosphere in other than extremely small quantities, so that the presence of the gas in the air outside the package, above some small "background" level, can reasonably be assumed to have come from inside the package.

Sulfur hexafluoride ($SF_6$; molecular weight 146.07) is presently used in the high-voltage transformer and circuit-breaker industry, and for leak-testing of industrial process equipment. $SF_6$ has been used as a nonhazardous "stand-in" gas in studies of the potential release hazards of radioactive materials, and medically as a replacement for argon in pneumothorax treatments. $SF_6$ is chemically inert at room temperature and atmospheric pressure. It is odorless, tasteless, colorless, and physiologically inert. The current OSHA standard for human exposure to $SF_6$ is 6,000 $mg/m^3$, or a concentration in air of about 0.46%. These qualities render it especially suitable for use with the present invention.

Because the outer shell of the $SF_6$ molecule consists of six atoms of fluorine—the most electronegative element known—the molecule is a very powerful electron scavenger. Therefore, it is detectable at very low concentrations, well below one part per trillion (ppt) in air using standard analytical techniques. There is no known naturally-occurring process which produces $SF_6$ in measurable quantities. Atmospheric levels of $SF_6$ are extremely low—typically around 0.1 ppt or less—and can be easily ignored in tracer-gas applications. Therefore, only very small amounts of $SF_6$ are needed for individual tests. Although $SF_6$ is preferred, other tracer gases can be used, including fluorocarbons such as carbon tetrafluoride (molecular weight 88.01).

Referring now to FIG. 1, a packaged product 10 includes an item 12 in a package 14. Item 12 is any product that is packaged before distribution. Thus, item 12 may be a consumable product such as a processed or unprocessed food, beverage, food supplement such as a vitamin, medication, condiment, spice, herb, or cooking oil. Item 12 may also be a product not meant for ingestion but which is preferably packaged in a leak-proof container. These products include batteries, film, litmus paper, cosmetics, toiletries, topical medications, bandages, glues, paints, paint thinners and volatile or toxic solvents such as acetone. Package 14 may be made of metal, glass, paper, plastics, metallic film, metallicized plastics, composite material or combinations thereof. The term "composite" is used herein to mean a multilayered packaging material such as is known in the art, having at least two layers of different materials.

The choice of closure for package 14 depends on the packaging material, the particular type of package, and the nature of item 12. A wide range of closures are available. By way of example, if package 14 is glass, the package may be closed by a metal or plastic screw cap, a pressure-fitted cap or a cork. A metal package such as a can may be closed by doubleseaming, crimping, compression fitting or soldering. Paper and plastic containers are typically heat sealed or doubleseamed. Packages made of composite materials are heat sealed, doubleseamed or compression-formed.

$SF_6$ (or other suitable tracer gas) may be added to product 10 in several ways, as seen in the following examples. A quantity of $SF_6$ can be injected into package 14 just before closure. The gas can be added directly to item 12, such as by exposing item 12 to $SF_6$ for a sufficient time for item 12 so that it can adsorb or absorb a quantity of the gas. Item 12 preferably contains at least approximately 0.1 part per million (ppm), more preferably at least approximately one ppm, and most preferably at least approximately ten ppm of the tracer gas. If desired, item 12 can be placed into a high-pressure chamber containing $SF_6$ to facilitate uptake of the gas by the item.

Alternatively, the gas can be added to a liquid such as water, oil, or alcohol. $SF_6$ is sparingly soluble in water (about 35 ppm at room temperature), but several orders of magnitude more soluble in oils and long-chain alcohols (typical edible oils can contain up to approximately 0.1–0.2% $SF_6$). A small quantity of the liquid is then added to item 12 during manufacture, placed onto item 12 before packaging, or placed into package 14 before closure, as indicated schematically by a liquid drop 18. $SF_6$-containing liquid can be added to a wide range of liquid or semi-liquid products, including soft drinks, juices, stews, and canned fruits and vegetables. The optimum concentration of $SF_6$ in item 12 depends on the size and composition of the item, the choice of packaging materials and closure style for package 14, the sensitivity and arrangement of the detecting instrument, and so forth. Therefore, the optimum amount of $SF_6$ for a particular product is best determined by observation and a modest amount of experimentation. However, typically a concentration on the order of a few parts per million of $SF_6$ will enable detection of concentration on the order of a few parts per trillion exterior to the package.

Alternatively, SF6 can be added to product 10 in the form of a package insert 20 in the same fashion as moisture absorbing materials are added to ground coffee. Suitable inserts include chemically-inert materials that are capable of absorbing $SF_6$ or an $SF_6$-containing liquid, such as absorbent paper, polyethylene beads, spun TYVEK® or other paper-like polyolefins, gelatin, silica gels, activated charcoal and combinations thereof. The gas or liquid is absorbed into insert 20, which is placed into package 14 before the package is closed or sealed. A plurality of polyethylene beads 22 can be added to package 14 after the beads have absorbed a sufficient quantity of $SF_6$.

If desired, $SF_6$ can be added to the package in the form of an $SF_6$-containing liner, as shown in FIG. 2. Thus, a composite packaging material 30 may include an $SF_6$-containing inner layer 32, a foil or plastic layer 36 and an outer layer 38. Inner layer 32 is formed of paper, TYVEK®, or some other material that is capable of absorbing $SF_6$ or $SF_6$-containing liquid. The gas is preferably added to a package made of material 30 by exposing layer 32 to $SF_6$ before closure.

It will be evident that $SF_6$ may be added to a package by other methods without departing from the spirit of the present invention. The quantity of $SF_6$ added to package 14 depends on the size of the package, the composition of item 12, the particular choice of packaging materials, and such other factors as will be evident to one of ordinary skill in the art. The optimum quantity is best determined by observation and some routine experimentation for each application.

After a suitable quantity of $SF_6$ is added to package 14, the package is closed or sealed by the techniques ordinarily used with that type of package. Package 14 is then tested for small holes as indicated in FIG. 3, generally as follows:

1. The background level of $SF_6$ in the test area is determined. $SF_6$ does not occur naturally in the atmosphere, so background levels are very low, typically on the order of 0.1 ppt.

2. The air outside package 14, preferably near the outer surface of the package, is monitored for the presence of $SF_6$ by any technique that is capable of detecting the small concentrations involved. Gas chromatography on a molecular-sieve column followed by electron capture is particularly suitable for use with the present invention. Because $SF_6$ is a strong electron scavenger, concentrations of $SF_6$ well below one part per trillion (ppt) can be detected by this means.

Capillary columns with inside diameters as small as 0.25 mm (250 μm) are commonly used for testing large numbers of samples in gas chromatography. Special-purpose columns with inside diameters as small as 0.05 mm (50 μm) are available.

In general, a smaller column diameter permits faster analysis while requiring a smaller sample. When a single gas, such as $SF_6$, is to be detected and other sample components are of little interest, a further gain in sample throughput can be attained by connecting multiple capillary columns to a common source of carrier gas and to a common detector, with manifold valves connecting each column to the detector only when the component of interest is emerging from the column.

A gas chromatograph capable of detecting $SF_6$ in concentrations as low as 0.01 ppt is described by C. A. Clemons, A. I. Coleman and B. E. Saltzman ("Concentration and Ultrasensitive Chromatographic Determination of Sulfur Hexafluoride for Application to Meteorological Tracing," *Environmental Science and Technology*, Vol. 2, No. 7, pp. 551–556, July, 1968). This instrument is suitable for use with the present invention. A preferable arrangement would use multiple columns, held at equal temperatures, and connected to a single carrier-gas source and electron-capture detector through low-holdup-volume manifold valves. Analyses of multiple samples could thus be conducted in parallel, with sampling rates of two per second readily attainable. Alternatively, other gas chromatographs that are capable of detecting $SF_6$ at low concentrations may be used.

For optimum performance of a capillary-column gas chromatograph, valves with extremely low internal holdup volumes are needed. Other desirable features would be few or no moving parts, and the ability of the valves to be controlled directly by an electronic controller.

A miniature low-holdup valve suitable for use with the present invention is made of a piezoelectric material that has a crystal structure with a high degree of electrical asymmetry along one or more of the crystal axes. Potentially usable materials include quartz and potassium sodium tartrate (Rochelle salt), but preferred materials are polycrystalline ceramics such as lead zirconate/titanate (PZT-5 ®) which can be built up in successive layers. By applying an external electric field to the material, the crystal flexes to accommodate the electrical stress. Stacked layers of the material, alternating with electrically conductive layers that can alternate in polarity, undergo mechanical displacements several orders of magnitude larger than the displacement of a single layer.

The valve can be made with any number of such stacks embedded in a suitable non-conducting support. Grooves can then be cut or etched into the surface along one edge, each groove leading from the edge up to and along part of the border between two adjacent piezoelectric stacks. A rigid, flat plate is positioned against the grooved surface. So described, the grooves form channels leading through the structure from an edge to the row of stacks.

When some of the odd-numbered stacks are energized to produce a net contraction while others are held at zero voltage, the contraction of the energized stacks opens passages between their upper surfaces and the cover plate sufficient to allow the flow of gas therethrough. If, for example, each stack is one mm (1,000 μm) square, the cross-sectional area of the passage it forms during contraction is 1,000 μm$^2$, about one-half that of the smallest grade of capillary tubing now in use. Smaller-area stacks may be used for smaller-scale applications. If desired, such piezoelectric stacks can be arranged into ring-shaped arrays to duplicate the functions of rotary valves, or into more complex arrays providing other functions.

As noted above, normal atmospheric concentrations of $SF_6$ are extremely low, typically on the order of 0.1 ppt. Therefore, the presence of a hole or holes 16 in package 14 can be determined from a higher $SF_6$ concentration near the package. The measured concentration near package 14 depends on the size of the package, the quantity of $SF_6$ added to the package, the elapsed time since closure of the package, and the sensitivity of the measuring equipment.

To facilitate leakage of $SF_6$ through holes 16 (if present), package 14 may be placed into a chamber having a lower pressure than atmospheric pressure. For example, closed packages may be conveyed into a low-pressure chamber where the air is monitored for the presence of $SF_6$. Measured $SF_6$ concentrations below a predetermined value indicate that the packages in the chamber are intact. The presence of a hole in one of the packages in the chamber is inferred from a measured $SF_6$ concentration above the predetermined value. These packages are diverted off-line and tested individually. Those packages that fail the test may be discarded or their contents repackaged, and the balance of the packages are distributed as usual.

An air curtain or a door may be sufficient to maintain the pressure in the test chamber at the desired level. Alternatively, an airlock may be used to prevent gas flow from the test chamber. A conventional airlock consists of a chamber having two opposing doors, only one of which can be open at a time. As a result, objects pass through the airlock discontinuously, in batches limited by the size of the airlock. Such airlocks are not suitable for continuous processes, where objects move in steady streams rather than in discrete batches.

A continuously-operating rotary airlock suitable for use with the present invention includes a stationary, generally horizontal housing and a rotating vane assembly having the same axis as the housing. The axis lies in or parallel with the plane of the wall dividing the test chamber from the surrounding area. The vane assembly has a plurality of equally-spaced radial vanes arranged so that least one vane forms a barrier between the interior and exterior of the test chamber on each side of the axis at all times. The stationary housing is preferably a partial shell located at the top of the airlock opening, connecting with the wall and occupying slightly more than the width of one sector formed by the vanes.

A conveyor belt runs generally horizontally under the airlock, forming a short concave arm immediately beneath and in contact with the rotating vane assembly. The arc preferably has the same circumferential length as the upper shell. The outer edges of the vanes form sliding seals against the interior of the housing and the inner edges of the opening, closing off successive areas of the moving belt. A sliding seal is preferably also formed on the lower surface of the conveyor to help maintain the desired pressure in the test chamber.

The optimum pressure in the test chamber depends on the type of packaging material chosen for package 14, the type of closure, the size of hole 16 (if present), the desired process speed, and the contents of the package. The pressure in the chamber should be lower than atmospheric pressure by no more than approximately one-half the pressure difference at which the package fails, preferably at least approximately $1 \times 10^{-3}$ atm. (0.1 atm. %) lower than atmospheric pressure. The optimum pressure is best determined empirically for each particular combination of package and contents.

3. The measured $SF_6$ concentration is compared to a predetermined value. If a concentration of $SF_6$ is sensed in the air outside package 14 above the predetermined value, the package may contain one or more holes. If the concentration is lower, the package may be presumed to be substantially hole-free. To avoid false positive readings, the measured concentration is compared to a predetermined value somewhat greater than the background level, such as five or ten times the background level. Preferably, the measured $SF_6$ concentration is displayed on a monitor that alerts the user whenever the $SF_6$ concentration rises above the predetermined value.

The $SF_6$ in package 14 may eventually diffuse through the packaging material even in the absence of holes and be dispersed into the atmosphere. Therefore, testing is preferably conducted shortly after packaging.

The presence of extremely small amounts of $SF_6$ in package 14 has no effect on the taste, color or odor of item 12. If package 14 has an $SF_6$-containing insert (such as insert 20 or 22), the insert is discarded before use. If $SF_6$ is added to item 12, the small amounts needed for leak testing have no known health and safety effects.

The present invention offers a nondestructive method for detecting small holes in relatively small, enclosed systems such as packaged products. Because of the size of the tested article, implementation of the method requires a tracer gas that can be readily detected at very low concentrations. $SF_6$ is detectable at low concentrations in air. Its high molecular weight allows it to pass through small holes such as microleaks, yet limits its diffusion rate through intact organic materials such as plastics. However, its other qualities also render it especially suitable for use with the invention: $SF_6$ is colorless, odorless, tasteless, and chemically and physiologically inert.

The invention can be used with packaged products where small, difficult-to-detect holes provide a route for contamination of the product, allow leakage of the product from the package, or leakage of air into the package.

It will be apparent to those skilled in the art that many changes and substitutions can be made to the preferred embodiment herein described without departing from the spirit and scope of the present invention as defined by the appended claims.

What is claimed is:

1. A method for detecting a hole in a material forming a package, said package containing an item, said method comprising the steps of:

adding a quantity of gas to said item, said gas selected to pass through said hole, but not said material from inside said package to outside said package;

placing said item into said package;

closing said package; and sensing outside said package to detect said gas, whereupon, if said gas is detected outside said package, the existence of said hole in said package is confirmed.

2. The method as recited in claim 1, wherein said sensing step further comprises the steps of:

measuring a concentration of said gas in an atmosphere when said package is present, said atmosphere containing a concentration of said gas not more than a predetermined value in the absence of said package; and comparing said concentration to said predetermined value.

3. The method as recited in claim 1, Wherein said sensing step further comprises the steps of:

establishing a concentration limit for said gas that is a multiple of a predetermined value;

measuring a concentration of said gas in an atmosphere when said package is present, said atmosphere containing a concentration of said gas not more than a predetermined value in the absence of said package and comparing said concentration to said concentration limit.

4. The method as recited in claim 1, wherein said sensing step further comprises the steps of:

measuring a concentration of said gas in an atmosphere when said package is present using gas chromatography, said atmosphere containing a concentration of said gas not more than a predetermined value in the absence of said package; and comparing said concentration to said predetermined value wherein said sensing step further comprises sensing the presence of said gas by gas chromatography.

5. The method as recited in claim 1, wherein said gas is sulfur hexafluoride.

6. A method for detecting a hole in a material forming a package, said package containing an item, said method comprising the steps of:

adding a quantity of gas to a liquid, said gas selected to pass through said hole, but not said material, from inside said package to outside said package;

placing said liquid into said package;

closing said package; and sensing outside said package to detect said gas, whereupon, if said gas is detected outside said package, the existence of said hole in said package is confirmed.

7. The method as recited in claim 6, wherein said sensing step further comprises the steps of:

measuring a concentration of said gas in an atmosphere when said package is present, said atmosphere containing a concentration of said gas not more than a predetermined value in the absence of said package; and comparing said concentration to said predetermined value.

8. The method as recited in claim 6, wherein said sensing step further comprises the steps of:

establishing a concentration limit for said gas that is a multiple of a predetermined value;

measuring a concentration of said gas in an atmosphere when said package is present, said atmosphere containing a concentration of said gas not more than a predetermined value in the absence of said package and comparing said concentration to said concentration limit.

9. The method as recited in claim 6, wherein said sensing step further comprises the steps of:

measuring a concentration of said gas in an atmosphere when said package is present using gas chromatography, said atmosphere containing a concentration of said gas not more than a predetermined value in the absence of said package; and comparing said concentration to said predetermined value wherein said sensing step further comprises sensing the presence of said gas by gas chromatography.

10. The method as recited in claim 6, wherein said gas is sulfur hexafluoride.

11. A method for detecting a hole in a material forming a package, said package containing an item, said method comprising the steps of:

adding a quantity of gas to an insert, said gas selected to pass through said hole, but not said material, from inside said package to outside said package;

placing said insert into said package;

closing said package; and sensing outside said package to detect said gas, whereupon, if said gas is detected outside said package, the existence of said hole in said package is confirmed.

12. The method as recited in claim 11, wherein said sensing step further comprises the steps of:

measuring a concentration of said gas in an atmosphere when said package is present, said atmosphere containing a concentration of said gas not more than a predetermined value in the absence of said package; and comparing said concentration to said predetermined value.

13. The method as recited in claim 11, wherein said sensing step further comprises the steps of:

establishing a concentration limit for said gas that is a multiple of a predetermined value;

measuring a concentration of said gas in an atmosphere when said package is present, said atmosphere containing a concentration of said gas not more than a predetermined value in the absence of said package and comparing said concentration to said concentration limit.

14. The method as recited in claim 11, wherein said sensing step further comprises the steps of:

measuring a concentration of said gas in an atmosphere when said package is present using gas chromatography, said atmosphere containing a concentration of said gas not more than a predetermined value in the absence of said package; and comparing said concentration to said predetermined value wherein said sensing step further comprises sensing the presence of said gas by gas chromatography.

15. The method of claim 11, wherein said gas is sulfur hexafluoride.

16. A method for detecting a hole in a material forming a package, said package containing an item, said method comprising the steps of:

placing a quantity of a gas into a package along with said item, said gas selected to pass through said hole, but not said material, from inside said package to outside said package;

closing said package;

putting said package into a chamber having a first atmosphere with a first pressure less than atmospheric, said package containing a second atmosphere at a second pressure, said first pressure being lower than said second pressure, and said first atmosphere having a concentration of said gas below a predetermined value when said package is absent and not leaking;

sensing outside said package to detect said gas, whereupon, if said gas is detected outside said package, the existence of said hole in said package is confirmed.

17. The method as recited in claim 16, wherein said sensing step further comprises the steps of:

measuring a concentration of said gas in an atmosphere when said package is present, said atmosphere containing a concentration of said gas not more than a predetermined value in the absence of said package; and comparing said concentration to said predetermined value.

18. The method as retired in claim 16, wherein said sensing step further comprises the steps of:

establishing a concentration limit for said gas that is a multiple of a predetermined value;

measuring a concentration of said as in an atmosphere when said package is present, said atmosphere containing a concentration of said gas not more than a predetermined value in the absence of said package and comparing said concentration to said concentration limit.

19. The method as recited in claim 16, wherein said sensing step further comprises the steps of:

measuring a concentration of said gas in an atmosphere when said package is present using gas chromatography, said atmosphere containing a concentration of said gas not more than a predetermined value in the absence of said package; and comparing said concentration to said predetermined value wherein said sensing step further comprises sensing the presence of said gas by gas chromatography.

20. The method of claim 16, wherein sad gas is sulfur hexafluoride.

21. An article for containing an item, said article made of a material that might have a hole in said material, said article tested to indicate the existence of said hole by a process comprising the steps of:

forming said material into a package;

adding a quantity of gas to said item, said gas selected to pass through a hole in said package, but not through said material, from inside said package to outside said package;

placing said item into said package; and closing said package, said gas indicating by its presence outside said package the existence of said hole in said package.

* * * * *